United States Patent
Ma et al.

(10) Patent No.: US 9,673,944 B2
(45) Date of Patent: Jun. 6, 2017

(54) METHOD FOR CONTROLLING PACKET ACCESS, NETWORK SIDE DEVICE, TERMINAL DEVICE AND COMMUNICATION SYSTEM

(71) Applicant: Huawei Technologies Co., Ltd., Shenzhen, Guangdong (CN)

(72) Inventors: Jie Ma, Beijing (CN); Song Zhu, Beijing (CN); Zhenxing Hu, Beijing (CN); Xiaolong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 14/016,904

(22) Filed: Sep. 3, 2013

(65) Prior Publication Data
US 2014/0050141 A1    Feb. 20, 2014

Related U.S. Application Data

(63) Continuation of application No. PCT/CN2012/070844, filed on Feb. 2, 2012.

(30) Foreign Application Priority Data

Mar. 4, 2011 (CN) .......................... 2011 1 0052928

(51) Int. Cl.
*H04H 20/71* (2008.01)
*H04L 5/00* (2006.01)
(Continued)

(52) U.S. Cl.
CPC ............. *H04L 5/003* (2013.01); *H04W 4/001* (2013.01); *H04W 4/005* (2013.01); *H04W 76/002* (2013.01); *H04W 4/06* (2013.01)

(58) Field of Classification Search
CPC ... H04W 76/002; H04W 4/001; H04W 4/005; H04W 4/06
(Continued)

(56) References Cited

U.S. PATENT DOCUMENTS

2004/0152476 A1* 8/2004 Kuwano et al. .............. 455/459
2004/0185837 A1   9/2004 Kim et al.
(Continued)

FOREIGN PATENT DOCUMENTS

CN        1505411 A      6/2004
CN        1518243 A      8/2004
(Continued)

OTHER PUBLICATIONS

"3GPP TS 23.246—3rd Generation Partnership Project; Technical Specification Group Services and Architecture; Multimedia Broadcast/Multicast Service (MBMS); Architecture and functional description (Release 9)," Version 9.3.0, 3rd Generation Partnership Project, Valbonne, France (Dec. 2009).
(Continued)

*Primary Examiner* — Faisal Choudhury
(74) *Attorney, Agent, or Firm* — Leydig, Voit & Mayer, Ltd.

(57) ABSTRACT

Embodiments of the present invention provide a method for controlling packet access, a network side device, a terminal device and a communication system. The method includes: generating an access trigger message, where the access trigger message carries a temporary mobile group identity TMGI allocated to a user equipment UE; and sending the access trigger message to packet trigger an access operation of the UE for the TMGI. In the embodiments of the present invention, the group identity TMGI already existing in an MBMS can be used as the group identity of packet triggering UE access, and the access trigger message carrying the
(Continued)

TMGI can be correspondingly generated and sent so as to trigger an access operation of the UE belonging to the TMGI, thereby implementing the function of the packet triggering user access.

10 Claims, 7 Drawing Sheets

(51) Int. Cl.
  *H04W 76/00* (2009.01)
  *H04W 4/00* (2009.01)
  *H04W 4/06* (2009.01)
(58) Field of Classification Search
  USPC ........................................................ 370/312
  See application file for complete search history.

(56) References Cited

U.S. PATENT DOCUMENTS

| | | |
|---|---|---|
| 2004/0227618 A1 | 11/2004 | Hwang et al. |
| 2005/0153715 A1 | 7/2005 | Hwang et al. |
| 2005/0195852 A1 | 9/2005 | Vayanos et al. |
| 2006/0109812 A1 | 5/2006 | Kim et al. |
| 2006/0176838 A1 | 8/2006 | Lee et al. |
| 2007/0005958 A1 | 1/2007 | Hsu et al. |
| 2007/0086437 A1* | 4/2007 | DiFazio .............. H04L 12/189 370/352 |
| 2007/0213081 A1* | 9/2007 | Zhang ................ H04L 12/189 455/466 |
| 2007/0275742 A1 | 11/2007 | Zhang |
| 2008/0020739 A1* | 1/2008 | Godin ................ H04W 72/005 455/414.1 |
| 2008/0163309 A1 | 7/2008 | Kauranen |
| 2008/0181158 A1* | 7/2008 | Bouazizi .............. H04L 67/04 370/312 |
| 2008/0242224 A1* | 10/2008 | Fratti et al. .................. 455/3.06 |
| 2009/0113487 A1* | 4/2009 | Nanjunda Swamy ............... H04L 12/185 725/62 |
| 2011/0235565 A1* | 9/2011 | Wu .................... H04W 72/005 370/312 |
| 2012/0106431 A1 | 5/2012 | Wu et al. |
| 2012/0170501 A1* | 7/2012 | Drozt et al. .................. 370/312 |
| 2012/0202493 A1* | 8/2012 | Wang .................. H04W 60/00 455/435.1 |
| 2013/0188547 A1* | 7/2013 | Moriwaki et al. ............ 370/312 |
| 2014/0135044 A1 | 5/2014 | Bergqvist et al. |
| 2016/0014720 A1* | 1/2016 | Wang ................ H04L 12/1863 370/312 |

FOREIGN PATENT DOCUMENTS

| | | |
|---|---|---|
| CN | 1534911 A | 10/2004 |
| CN | 1748386 A | 3/2006 |
| CN | 1956451 A | 5/2007 |
| CN | 101018168 A | 8/2007 |
| CN | 101039503 A | 9/2007 |
| CN | 101184335 A | 5/2008 |
| CN | 101568071 A | 10/2009 |
| EP | 1777873 A1 | 4/2007 |
| JP | 2007522776 A | 8/2007 |
| JP | 2008507930 A | 3/2008 |
| JP | 2012533240 A | 12/2012 |
| JP | 2011501923 A | 1/2013 |
| JP | 2013509800 A | 3/2013 |
| WO | WO 2009053111 A | 4/2009 |
| WO | WO 2011006437 A1 | 1/2011 |

OTHER PUBLICATIONS

"3GPP TS 29.061—$3^{rd}$ Generation Partnership Project; Technical Specification Group Core Network and Terminals; Interworking between the Public Land Mobile Network (PLMN) supporting packet based services and Packet Data Networks (PDN) (Release 10)," Version 10.1.0, $3^{rd}$ Generation Partnership Project, Valbonne, France (Dec. 2010).
"Group paging for MTC devices" 3GPP TSG-RAN2 Meeting #70bis, Stockholm, Sweden, R2-104004, $3^{rd}$ Generation Partnership Project, Valbonne, France (Jun. 28-Jul. 2, 2010).
"Device Trigger reuse of MBMS," 3GPP TSG SA WG2 Meeting #84, Bratislava, Slovak, TD S2-111502, $3^{rd}$ Generation Partnership Project, Valbonne, France (Apr. 10-15, 2011).
"Introduction of MBMS counting procedure," 3GPP TSG-RAN WG3 Meeting #71, Taipei, R3-111042, Change Request, $3^{rd}$ Generation Partnership Project, Valbonne, France (Feb. 21-25, 2011).
"Overload control for MTC in GERAN," 3GPP TSG-GERAN #46, Jeju, South Korea, GP-100716, $3^{rd}$ Generation Partnership Project, Valbonne, France (May 17-21, 2010).
"Grouping of MTC devices," 3GPP TSG-RAN WG2 Meeting #74, Barcelona, Spain, R2-112953, $3^{rd}$ Generation Partnership Project, Valbonne, France (May 9-13, 2011).
"$3^{rd}$ Generation Partnership Project; Technical Specification Group Radio Access Network; Introduction of the Multimedia Broadcast/Multicast Service (MBMS) in the Radio Access Network (RAN); Stage 2; (Release 9)," 3GPP TS 25.346, V9.1.0, pp. 1-71, $3^{rd}$ Generation Partnership Project, Valbonne, France (Mar. 2010).

* cited by examiner

METHOD FOR CONTROLLING PACKET ACCESS, NETWORK SIDE DEVICE, TERMINAL DEVICE AND COMMUNICATION SYSTEM

CROSS-REFERENCE TO RELATED APPLICATIONS

This application is a continuation of International Patent Application No. PCT/CN2012/070844, filed on Feb. 2, 2012, which claims priority to Chinese Patent Application No. 201110052928.0, filed on Mar. 4, 2011, both of which are hereby incorporated by reference in their entireties.

TECHNICAL FIELD

Embodiments of the present invention relate to the field of communication, and in particular, to a method for controlling packet access, a network side device, a terminal device and a communication system.

BACKGROUND

Internet of Things, hereinafter referred to as M2M (Machine to Machine), was first proposed in 1999. The purpose is to connect all things to the Internet via information sensing devices, thereby implementing intelligent identification and management. By combining information sensing devices with the Internet, remote sensing and control of all things can be implemented, thereby forming a more intelligent production and living system. It is huger than the current Internet and widely applied to a plurality of fields such as the smart grid, intelligent traffic, environment protection, government work, public security, smart home, intelligent fire control, industrial surveillance, elderly nursing, and personal health.

It may be predicted that Internet of Things is another wave of information industrial after the computer, Internet, and mobile communication network, and will be popularized on a large scale. With the development of technical, the amount of M2M devices will grow tremendously. These devices will integrate tightly with the wireless communication technology, and obtain data or report the data to a control center via wireless connection. But in this condition, a large amount of random or periodical reporting data is generated. The data may come from various specific applications, such as a wireless water meter and electricity meter, a vending machine, and a pos terminal. Applications of this type have a great impact on the network, even causing network congestion or even breakdown.

The technology that triggers user access, taking an LTE system (Long Term Evolution; Long Term Evolution) as an example, currently uses a paging message to gradually trigger user access. Based on this technology, when a large amount of terminals need to trigger access concurrently, the paging channel is heavily loaded, easily causing network congestion.

In certain M2M applications where a large amount of users perform reporting concurrently, if concurrent user reporting is not under control, the network will be subject to a severe impact, resulting in network congestion or even breakdown. The network may use the paging method to effectively control access of a large amount of users, thereby reducing the network impact due to access of a large amount of users. However, separate paging of each user will occupy mass paging resources of the system, evening affecting normal paging of other users.

SUMMARY

A plurality of aspects of the present invention provide a method for controlling packet access, a network side device, a terminal device and a communication system, capable of implementing the function of packet triggering access.

According to one aspect of the present invention, a method for controlling packet access is provided, including: generating an access trigger message, where the access trigger message carries a temporary mobile group identity TMGI allocated to a user equipment UE; and sending the access trigger message to packet trigger an access operation of the UE for the TMGI.

According to another aspect of the present invention, a method for controlling packet access is provided, including: receiving an access trigger message, where the access trigger message carries a temporary mobile group identity TMGI allocated to a user equipment UE; and performing an access operation for the TMGI according to the access trigger message.

According to still another aspect of the present invention, a network side device is provided, including: a processor, configured to generate an access trigger message, where the access trigger message carries a temporary mobile group identity TMGI allocated to a user equipment UE; and a transceiver, configured to send the access trigger message to packet trigger an access operation of the UE for the TMGI.

According to yet another aspect of the present invention, a terminal device is provided, including: a transceiver, configured to receive an access trigger message, where the access trigger message carries a temporary mobile group identity TMGI allocated to a user equipment UE; and a processor, configured to perform an access operation for the TMGI according to the access trigger message.

According to further another aspect of the present invention, a communication system is provided, including the foregoing network side device or terminal device.

In the embodiments of the present invention, the group identity TMGI already existing in an MBMS (Multimedia Broadcast/Multicast Service, multimedia broadcast/multicast service) can be used as the group identity of packet triggering UE access, and the access trigger message carrying the TMGI can be correspondingly generated and sent so as to trigger an access operation of the UE belonging to the TMGI, thereby implementing the function of the packet triggering user access.

BRIEF DESCRIPTION OF DRAWINGS

To illustrate the technical solutions of the embodiments of the present invention more clearly, the following briefly describes the accompanying drawings required for describing the embodiments or the prior art. Apparently, the accompanying drawings in the following description merely show some embodiments of the present invention, and persons of ordinary skill in the art can derive other drawings from these drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technical solutions of the present invention are applicable to GSM, LTE and UMTS communication systems, or other wireless communication systems that support an MBMS.

In the embodiments of the present invention, each node, an interface between nodes, and a message transported on interfaces in an MBMS technology can be used to trigger a user to access the network.

Figure 1:
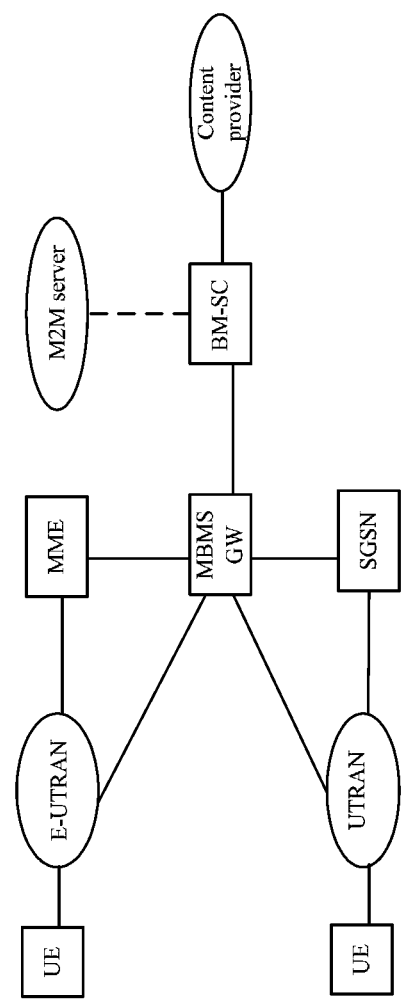
FIG. 1 is a schematic diagram of a network architecture of an MBMS.

FIG. 1 is a schematic diagram of a network architecture of an MBMS. A user equipment UE, via an RAN (Radio Access Network; radio access network) such as a UTRAN (Universal Terrestrial Radio Access Network; universal terrestrial radio access network) and an E-UTRAN (Evolved Universal Terrestrial Radio Access Network, evolved universal terrestrial radio access network), accesses the CN (Core Network, core network). When a UE node is required to be triggered to access the network, in the CN, a BM-SC (Broadcast Multicast-Service Center; broadcast multicast-service center) is connected with an M2M server directly or via other devices. The BM-SC has functions of maintaining and managing packet users.

Figure 2:
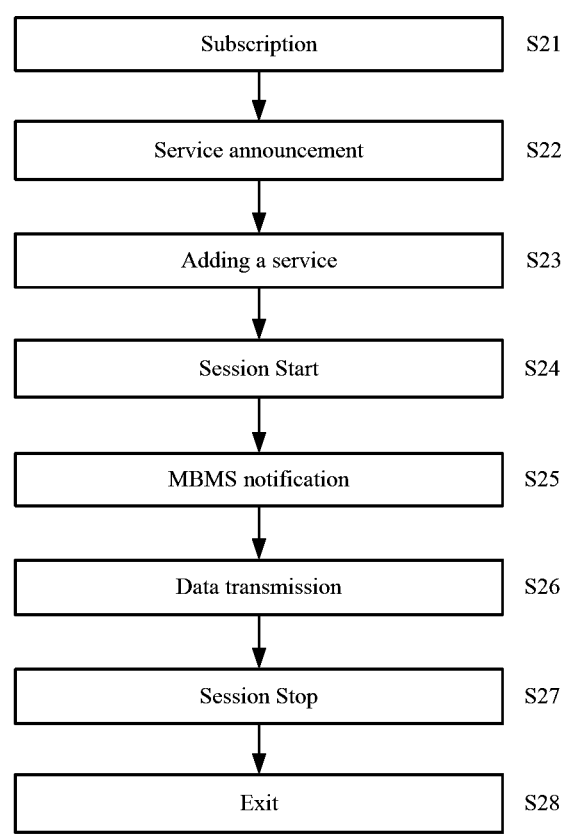
FIG. 2 is a schematic diagram of a working process of an MBMS.

FIG. 2 is a schematic diagram of a working process of an MBMS, where S21, S23, S28 are specific for multicast, and other operations are processes for both broadcast and multicast. In S21 shown in FIG. 2, perform a subscription operation (subscription); in S22, send a service announcement (service announcement); in S23, a UE adds the service; in S24, a session starts. In S25, an MBMS notifies; then in S26, transmit data to the UE. When a session stop (session stop) message is sent in S27, broadcast or multicast ends. In S28, the UE leaves the service.

In the embodiment of the present invention, the function of an existing MBMS technology that triggers a group of users to initiate access in a wireless cellular communication network is used, and control of the amount of users that access the network can be implemented according to information such as the load of the wireless network. Furthermore, the function of an existing MBMS technology may also be used as the identifier for triggering public bearing and connection establishment, thereby further reducing the impact to the network due to access of a large amount of terminals.

Figure 3:
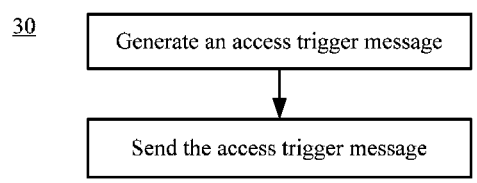
FIG. 3 is a schematic flowchart of a method for controlling packet access according to an embodiment of the present invention.

FIG. 3 is a schematic flowchart of a method 30 for controlling packet access according to an embodiment of the present invention. The method 30 is mainly executed by a network side device, such as a BM-SC in a core network or an eNB (evolved NodeB, evolved NodeB) or an RNC (Radio Network Controller, radio network controller) in a radio access network.

As shown in FIG. 3, in S31, generate an access trigger message. The access trigger message carries a temporary mobile group identity TMGI (Temporary Mobile Group Identification) allocated to a user equipment UE. For example, a BM-SC may allocate different TMGIs for each group of users.

Then in S35, send the access trigger message to packet trigger an access operation of the UE for the TMGI.

In this way, in the embodiment of the present invention, the group identity TMGI already existing in an MBMS can be used as the group identity of packet triggering UE access, and the access trigger message carrying the TMGI can be correspondingly generated and sent so as to trigger an access operation of the UE belonging to the TMGI, thereby implementing the function of the packet triggering user access.

According to an embodiment of the present invention, a core network packet may first be performed on the UE, a TMGI may be allocated to each core network packet of the UE, and the UE may be notified. The method of allocation and notification may be implemented by adopting a traditional MBMS service notification method; notification may also be performed after this part of users access the network; or this part of TMGIs is reserved to users in advance, and modification and maintenance are performed after they access the network. The MBMS processes such as S21 (subscription) and S22 (service announcement) may be used to perform packet maintenance and notification.

Additionally, as regards a certain service, in the embodiment of the present invention, a mapping relationship between a TMGI and the service may also be established, and the UE may be notified of the mapping relationship. For example, meter-reading business of a certain grid company classified as a business, establishes a mapping relationship between the service and a certain TMGI.

In S31 of the method 30, according to an embodiment of the present invention, in the core network, a Session Start Request (session start request) of an MBMS may be used to generate an access trigger message of the embodiment of the present invention, so as to trigger a group of users having same services to access. The BM-SC, after receiving related information from the server, sends the Session Start Request message to a downstream node, and the TMGI carried in the Session Start Request corresponds to different user packets. To enable nodes to distinguish between a traditional MBMS Session Start Request message and the message (namely, an access trigger message) for triggering packet user access in the embodiment of the present invention, an indication information element IE (Information Element) may be added to the Session Start Request, or use a spare or reserved position in the message, or use a specific message format.

Specifically, a special indication IE may be added, which may be called G-Indicator, to the original Session Start Request for indicating that the current Session Start Request is the message for triggering packet user access. Each node, after receiving this indication, determine that the current message is used to trigger packet user access, and then perform subsequent operations.

The following Table 1 describes an example of adding an information element to the Session Start Request that serves as the access trigger message.

TABLE 1

| Information element added in the Session Start Request | |
|---|---|
| Name of Information Element (IE/Group Name) | Mandatory/ Optional (Presence) |
| G-Indicator | Optional (O) |

Alternatively, a spare or reserved position of the original Session Start Request message may be used to indicate that the current message is the message for triggering packet user access.

The foregoing two manners are explicit indication manners. In the embodiment of the present invention, an implicit indication manner may also be adopted. For example, according to another embodiment of the present invention, some special message formats of the original Session Start Request may be used to indicate that the current message is the message for triggering packet user access. Here, the special message formats may be the combination of some IEs in the Session Start Request. For example, some TMGIs, Session IDs (session identifier), or the like are used as the indication of the current message for the access trigger message.

Meanwhile, to further save resources, some IEs, that are unnecessary for triggering the UE to access the network, of the Session Start Request message may be deleted or modified.

The Session Start Request message of the MBMS is mainly transmitted between network elements on the network side. In the radio access network, a corresponding access trigger message may also be generated to packet trigger the UE to access. In S31 of the method 30, according to an embodiment of the present invention, the RAN generates a multipoint control channel MCCH (Multipoint Control CHannel) message carrying the TMGI, as the access trigger message.

For example, a special indication information to the message (such as multimedia broadcast single frequency network area configuration MBSFNAreaConfiguration message; Multimedia Broadcast Single Frequency Network Area Configuration) carrying the TMGI and transmitted on the corresponding Multipoint Control Channel MCCH is added, for notifying the user having the same TMGI of accessing the network, such as adding a G-Indicator or an access information AccessInformation information element.

Alternatively, an RAN node uses a spare or reserved position of the original message on the MCCH to indicate that the current message is the message for triggering packet user access.

The foregoing two manners are explicit indication manners. In the embodiment of the present invention, an implicit indication manner may also be adopted. For example, according to another embodiment of the present invention, some special message formats of the original message on the MCCH may also be used to indicate that the current message is the message for triggering packet user access. Here, the special message formats may be using some TMGIs, Session IDs, or the like as the indication of the current message for triggering packet user access message.

Meanwhile, to further save resources, some IEs, that are unnecessary for triggering the UE to access the network, of the original MCCH message may also be deleted or modified.

According to another embodiment of the present invention, the Counting mechanism of the MBMS technology may be improved for triggering access of packet users. In this condition, in S31, the RAN may extend the Counting Request message of the MBMS as the access trigger message.

Figure 4:
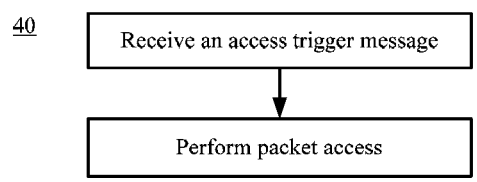
FIG. 4 is a schematic flowchart of a method for controlling packet access according to an embodiment of the present invention.

FIG. 4 is a schematic flowchart of a method 40 for controlling packet access according to an embodiment of the present invention. The method 40 is mainly executed by a user equipment UE.

As shown in FIG. 4, in S41 of the method 40, the UE receives an access trigger message, where the access trigger message carries a TMGI allocated to the UE. Then in S45, perform an access operation for the TMGI according to the access trigger message.

In this way, in the embodiment of the present invention, the group identity TMGI already existing in an MBMS can be used as the group identity of packet triggering UE access, and the access trigger message carrying the TMGI can be correspondingly generated and sent so as to trigger an access operation of the UE belonging to the TMGI, thereby implementing the function of the packet triggering user access.

Corresponding to the foregoing operations on the network side, the UE may listen to the MCCH message that serves as the access trigger message and is transmitted in the MCCH, or receive the Counting Request message that serves as the access trigger message.

Figure 5:
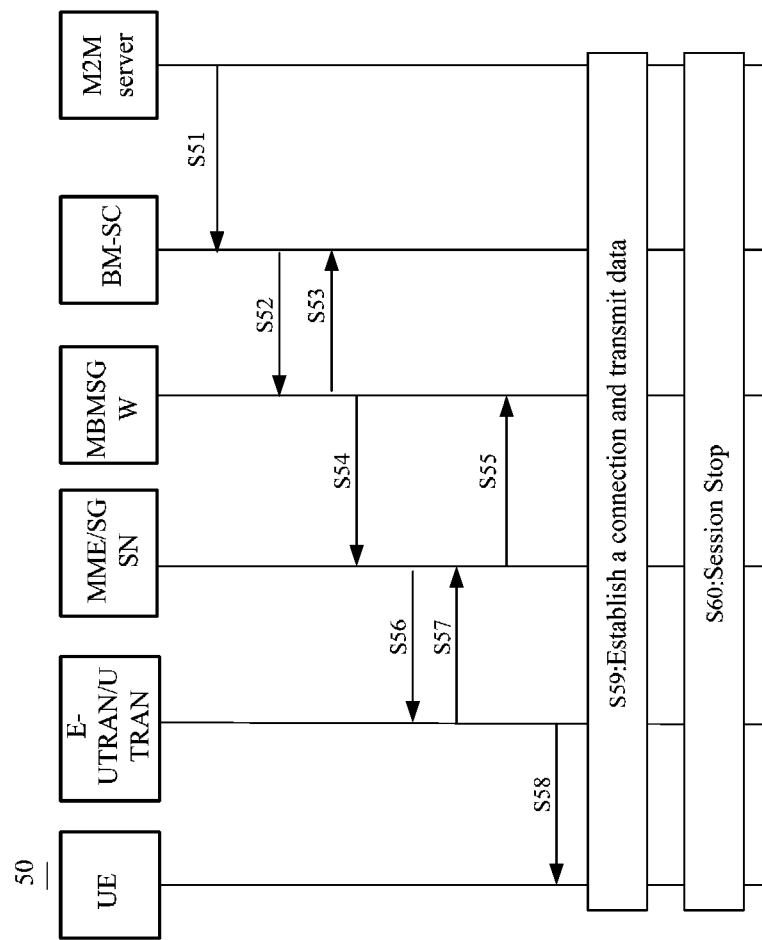
FIG. 5 is a schematic diagram of a process of triggering access according to an embodiment of the present invention.

The following details the process of controlling packet access according to the embodiment of the present invention. FIG. 5 is a schematic diagram of a process 50 of triggering access according to an embodiment of the present invention. In the process 50, make small modification to each Session Start Request message on the network, even no modification to some messages.

First in S51, an M2M server initiates an access request. A BM-SC handles it and allocates a TMGI, and in S52, sends a Session Start Request message to a downstream node as an access trigger message of the core network. Each downstream node MBMS GW (gate way; Gate Way), MME (Mobility Management Entity; mobility management entity)/SGSN (servicing GPRS support node; Servicing GPRS Support Node) forwards the Session Start Request message downward (S52, S54, S55), and may correspondingly return a Session Start Response (session start response) message to an upstream node (S53, S55, S57).

In S58, the RAN, after receiving the corresponding Session Start Request message, sends a MBSFNAreaConfiguration message via the MCCH as the access trigger message of the access layer, and uses the carried TMGI to trigger the UE in the corresponding packet of a cell to access.

The UE, after receiving the corresponding TMGI, initiates access. If the access is successful, in S59, establish a connection and performs data transmission until an end message is received in S60, such as a Session Stop (session stop) message or an indication message in other forms for indicating access stop. S59 may be a connection established separately for each user, or a public connection.

The period from Session Start to Session Stop may contain multiple times of packet triggering access, making majority of users in the packet access successfully.

According to an embodiment of the present invention, the UE in each packet only initiates one successful access in a certain period. In other word, if the UE accesses successfully once, the UE automatically ignores, in a certain period or before receiving the Session Stop message, the MBSFNAreaConfiguration message containing the same TMGI.

The process 50 according to the embodiment of the present invention implements the function of packet triggering access.

Figure 6:
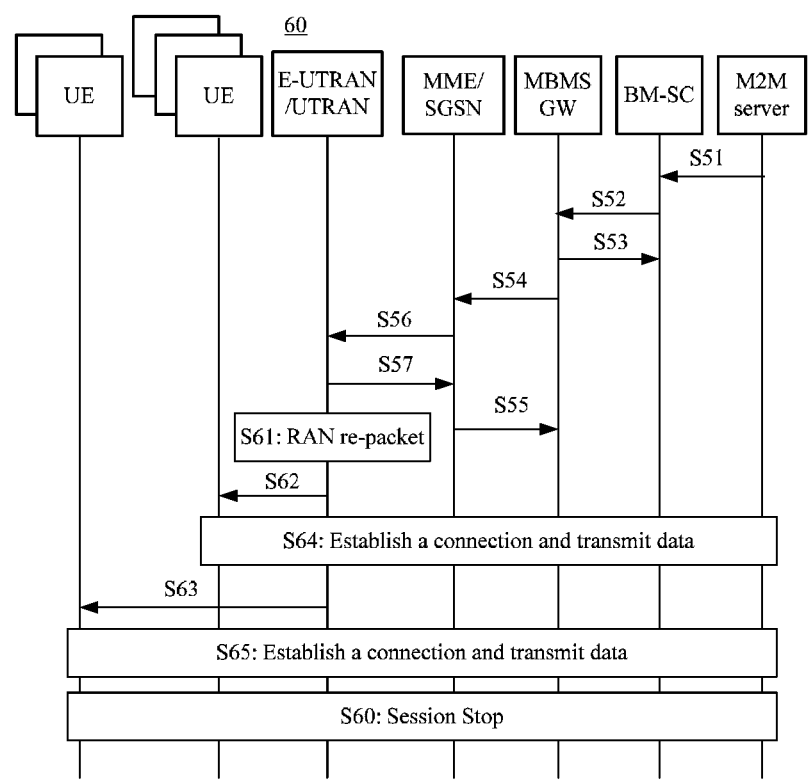
FIG. 6 is a schematic diagram of a process of triggering access according to another embodiment of the present invention.

To further perform access control according to information such as the load situation of the radio access network, a radio access network side re-packet may be performed. FIG. 6 is a schematic diagram of a process 60 of triggering access according to another embodiment of the present invention. The process 60 is a solution for a radio access network packet. In FIG. 6, parts same or similar to those of FIG. 5 are marked by same reference signs and not repeatedly described.

The main difference between FIG. 6 and FIG. 5 is S61 at the UTRAN or E-UTRAN: a radio access network re-packet. The radio access network re-packet may perform access control according to RAN load, and effectively reduce occurrence of access collision. The RAN, by setting an access parameter, combines with the TMGI, and triggers and controls access of packet users. For example, the UE uses the TMGI and the access parameter to re-packet users, and the UE determines, according to the received TMGI and the access parameter, whether to initiate access. In this case, the RAN may set, according to the cell load and the amount of UEs belonging to the TMGI in a cell or according to the cell load, the access parameter for controlling UE access, and carry the access parameter in the MCCH message. The access parameter includes a plurality of methods and a combination thereof: access probability factor, modulo, allowed access time length, and so on.

If the user distribution situation of each cell can be obtained, RAN packet may further be performed more precisely according to the current network load situation and the amount of user, and the method for obtaining the cell user packet information is as follows:

The first type is obtaining related information from a CN (Core Network; core network) nodes and/or server. This method is applicable to applications where the terminals are fixed, such as intelligent meter-reading. In this case, position information update frequency is low, and therefore, related information may be stored for periodical or event triggered update.

The second type is obtaining related information from the UE. This method is also applicable to scenarios where terminals move. The UE notifies the RAN of related packet information and may update the packet information.

To notify the UE of related RAN packet information, the UE needs to be notified of the related access parameter.

Specifically, after the RAN receives the Session Start Request message, if the UE stores the packet user situation of the current cell or may obtain the packet user situation of the current cell from other nodes, the RAN calculates, according to the load situation of the current cell and the amount of user of the current cell in the packet, the access parameter and notifies the UE by adding the access parameter information to the MBSFNAreaConfiguration message.

After the RAN receives the Session Start Request message, if the UE does not reserve the packet user situation of the current cell and fails to obtain the packet user situation of the current cell from other nodes, the RAN sets, according to the load situation of the current cell, the access parameter and notifies the UE via the MBSFNAreaConfiguration.

Additionally, the RAN is capable of adjusting the subsequent access parameter according to the amount of users that have access successfully before, the access parameter, and the change of the network load.

S62 and S63 are similar to S58 of FIG. 5 respectively. But according to the RAN re-packet, S62 and S63 respectively trigger each re-packet UE to access, and after the access succeeds, respectively establish connections in S64 and S65 and perform data transmission. S64 and S65 are respectively similar to S59 of FIG. 5.

After the Session Stop message is received from an upstream node in S60, the RAN notifies the UE that this packet triggering access ends, and releases related resources. The RAN may also, after meeting a certain stop condition (there are a variety of stop conditions: the amount of users triggered to access being 0, all users having accessed, and so on), trigger the Session Stop message by itself. For the UE that fails to access after the Session Stop, the network initiates an individual call later to perform access or the UE itself initiates an access request. the UE may also not send the packet triggering access end message, but use a special access parameter as the end identifier of the current packet triggering access. Or the UE is not notified of the packet triggering access end message, but instead, the UE makes a judgment by itself.

The UE may listen to the corresponding MCCH, receives the MBSFNAreaConfiguration message, and calculates and determines, according to the access parameter contained therein, whether to initiate access, such as determining to initiate access or continue to listen to the MCCH.

Specifically, if the UE successfully initiates access once, then in the subsequent process, the UE does not initiate access of the same packet until receiving the end message or failing to receive the related packet triggering access message within a period. The UE, if failing to initiate access, continues to listen to the corresponding channel and re-accesses during the subsequent packet triggering access process.

If the UE, after obtaining the end or failing to receive the related packet triggering access message within a period, still fails to access, the UE may, according to the need, initiate an access request or wait for the network paging to initiate an access request. A special access parameter may be used as the end identifier of the packet triggering access.

Adopting the radio access network re-packet solution according to the process 60 of the embodiment of the present invention, is in one aspect capable of quickly and effectively controlling the radio access network load, and in another aspect capable of effectively reducing occupation of a downlink channel.

Besides the MCCH message, in the embodiment of the present invention, the Counting (counting) mechanism of an MBMS may also be used to perform packet triggering access.

In this condition, an RAN node, after receiving the Session Start Request message from an upstream node, triggers the Counting mechanism and sends an MBMS Counting Request message to the UE as the triggering access message. The Counting mechanism herein, different from the common Counting mechanism of the MBMS, uses an enhanced Counting mechanism to implement accessing the network of all users, which stops the enhanced Counting process until all or most users access the network successfully. Triggering packet users by adopting the enhanced Counting mechanism may need to trigger a group of users for multiple times and gradually enable all or most users of the group to access the network, and requires that the network is capable of notifying the UE when to end the packet triggering. The identifier notifying the end of the packet triggering may be a special access probability factor, different Session IDs, or a special message, and so on. Before receiving the end identifier, the UE belonging to the packet, if having accessed successfully once using this triggering method, does not initiate an access request; after receiving the end identifier, the UE may reuse this method to trigger packet users to access the network.

Figure 7:
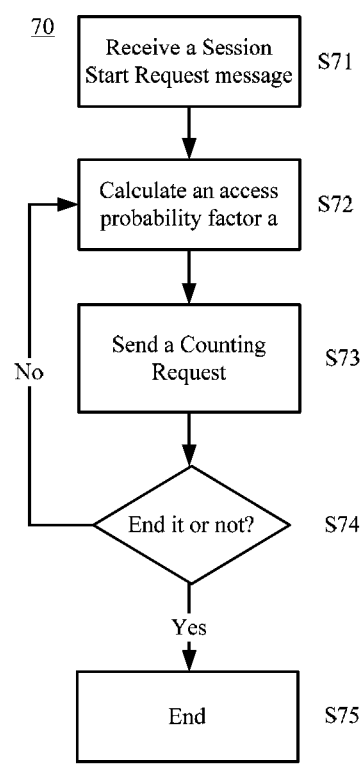
FIG. 7 is a schematic flowchart of a method for a radio access network triggering access according to an embodiment of the present invention.

The following describes a schematic diagram of an example of the operation process of the RAN in this condition. FIG. 7 is a schematic flowchart of a method 70 for an RAN triggering access according to an embodiment of the present invention. In the method 70, the foregoing Counting mechanism is adopted and an access probability factor a of the mechanism is used as an example of an access parameter. First in S71 of the method 70, an RAN node receives a Session Start Request message from an upstream node, which carries a TMGI of the packet. Then in S72, calculate the access probability factor a. Here, if the RAN itself stores the UE situation of the packet of the current cell or may obtain the UE situation of the packet of the current cell from other nodes, in S72, the RAN calculates, according to the load situation of the current cell and the amount of UEs that belongs to the TMGI in the current cell of the packet, the access probability factor a and notifies the UE. In another aspect, if the RAN does not reserve the UE situation of the packet of the current cell and fails to obtain the UE situation of the packet of the current cell from other nodes, the RAN sets, according to the load situation of the current cell, a smaller probability factor a and notifies the UE. Generally, a needs to be set to a relatively small value in this case.

Additionally in S72, the RAN may adjust the subsequent access probability factor a according to the amount of users that have access successfully before, the access probability factor, and the change of the network load. Furthermore, a is required to be not greater than 1; if the calculation shows that a is greater than 1, it may be set a=1.

The RAN, in S73, sends an enhanced Counting Request message as an access trigger message of the embodiment of the present invention. The message also carries the access probability factor a for the UE to determine whether to initiate access.

In S74, determine whether the current packet triggering access meets a stop condition. There are a variety of stop conditions, including receiving a Session Stop message from an upstream node, a=1, the amount of users triggered to access being 0, all users having accessed, and so on. If the stop condition is not met ("No" branch of S74), S72 is returned to and the access probability factor a of next time is continued to be calculated.

If the stop condition is met ("Yes" branch of S74), the packet triggering access is ended, and an end message is generated and the UE is notified. (For example, sending an end message or using a specific access parameter, such as a=o or 1, as the indication of the message that notifies the UE to stop the packet triggering access). It may also be that the related packet triggering access message is not sent within a period but the UE is left to determine the end by itself.

For the user that fails to access after the packet access triggering ends, the network initiates paging later to perform access or the user itself initiates an access request.

Correspondingly, the UE, after receiving the Counting Request message, determines according to the access parameter therein whether to report. The UE, that needs to be reported, establishes a connection after the Counting Request message. If the UE accesses the network successfully, then in the subsequent process, the UE does not initiate access until receiving the end message or failing to receive the related packet triggering access message within a period.

If the UE fails to access the network, the UE continues to listen to the MCCH and determines whether to report according to the access parameter therein.

The user, that fails to receive the Counting Request message and fails to initiate access via calculation, continues to listen to the Counting Request message and determines according to the access parameter therein whether to report.

If the UE, after receiving the access parameter indicating the end (such as the end message or the foregoing a=0 or 1) or failing to receive the related packet triggering access message within a period, still fails to initiate access, the UE may, according to the need, initiate by itself an access request or wait for the network paging to initiate an access request.

In this way, in the embodiment of the present invention, the Counting mechanism of an MBMS can be extended to implement packet triggering access.

According to an embodiment of the present invention, the Session Start Request message, besides containing the TMGI, may also contain other IDs, such as a Session ID. In this case, the foregoing solution may be enhanced by using the Session ID.

For example, a BM-SC may further divide, according to different Session IDs, the previous CN packet (identified by the TMGI), and establish a mapping relationship between the Session ID and access information (such as an access probability factor). In this way, the TMGI and Session ID may be used together to trigger and control access of a group of users.

According to another embodiment of the present invention, the Session ID may be used to distinguish different operations of a group of UEs (identified by the TMGI). For example, as regards intelligent meter-reading, different operations such as network access and measurement may be performed to map Session IDs to different operations and notify the UE, and may use the TMGI and the Session ID to control operations of a group of UEs.

Additionally, different Session IDs may also be used to control times of access initiated by users. For example, in the foregoing solution, the UE, after accessing the network successfully and before the Session ID changes, does not initiate access according to the MCCH information; after the Session ID changes, the UE re-starts the packet access process, namely, re-sending the access trigger message carrying the changed Session ID. In this way, multiple times of triggering packet user access in the same TMGI process can be implemented.

According to another embodiment of the present invention, an MBMS may also be used to notify the user packet triggering behavior. The length of the MCCH message is generally limited, and in many applications, the UE operations/behaviors or the like may have diversity. For example, apart from triggering user packet access, there are still some other operations, such as notifying some UEs to detect parameters, or triggering some users to access the network, or triggering some users to update firmware; or notifying users of further operations, such as reporting a data type or address, after accessing the network. In this condition, expansion may further be performed on the basis of the foregoing solution: apart from notifying corresponding users in the MCCH, an MTCH message corresponding to the MCCH message may also be generated and the corresponding UE in the corresponding MTCH is notified of controlling operations of the UE. In this case, the UE, after obtaining information transmitted in the MCCH, further listens to the data transmitted in the MTCH (MTCH message) and performs further operations, such as initiating access, monitoring data or updating firmware, according to the MTCH message.

Therefore, in the embodiment of the present invention, the TMGI is used as the identifier of M2M in the CN packet to implement packet triggering access. In some embodiments of the present invention, packet access triggering of the CN and the RAN can be effectively implemented, and packets of the CN and the RAN can be maintained according to network situation. Additionally, in the embodiments of the present invention, packet triggering access and lower complexity can be implemented without adding a new signaling, and current systems can be compatible with.

Figure 8:
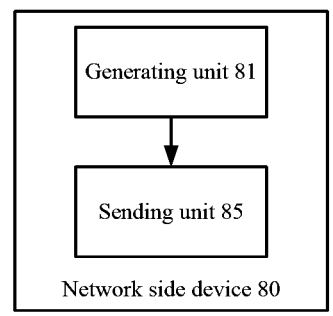
FIG. 8 is a schematic block diagram of a network side device according to an embodiment of the present invention.

FIG. 8 is a schematic block diagram of a network side device 80 according to an embodiment of the present invention. The network side device 80 may be a core network device (such as a BM-SC) or a corresponding device (such as an eNB in E-UTRAN, an RNC in UTRAN) in a RAN. As shown in FIG. 8, the network side device 80 includes a generating unit 81 and a sending unit 82.

The generating unit 81 is configured to generate an access trigger message, where the access trigger message carries a temporary mobile group identity TMGI allocated to a user equipment UE. The sending unit 85 is configured to send the access trigger message to packet trigger an access operation of the UE for the TMGI.

Various parts of the network side device 80 are capable of implementing the foregoing various methods, which are not detailed herein to avoid repetition. For example, according to an embodiment of the present invention, when the network side device 80 is a core network device, the generating unit 81 may add an indication information element to a Session Start Request message of an Multimedia Broadcast Multicast Service MBMS and generate an access trigger message using a spare or reserved position in the Session Start Request message or a combination of information elements in the Session Start Request message.

According to another embodiment of the present invention, when the network side device 80 is an access network device, the generating unit 81 generates a Multipoint Control Channel MCCH message carrying a TMGI or generates a Counting Request message of the MBMS carrying the TMGI, as the access trigger message.

In this way, in the embodiment of the present invention, the group identity TMGI already existing in the MBMS can be used as the group identity of packet triggering UE access, and the access trigger message carrying the TMGI can be correspondingly generated and sent so as to trigger an access operation of the UE belonging to the TMGI, thereby implementing the function of the packet triggering user access.

Figure 9:
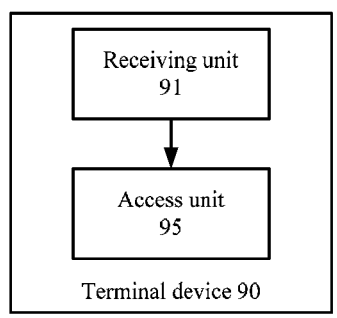
FIG. 9 is a schematic block diagram of a terminal device according to an embodiment of the present invention.

FIG. 9 is a schematic block diagram of a terminal device 90 according to an embodiment of the present invention. The terminal device 90 may be a user equipment UE in FIG. 1. As shown in FIG. 9, the terminal device 90 includes a receiving unit 91 and an access unit 95.

The receiving unit 91 is configured to receive an access trigger message, where the access trigger message carries a temporary mobile group identity TMGI allocated to a user equipment UE. The access unit 95 is configured to perform an access operation for the TMGI according to the access trigger message.

Various parts of the terminal device 90 are capable of implementing the foregoing various methods, which are not detailed herein to avoid repetition. For example, according to an embodiment of the present invention, the receiving unit 91 is capable of listening to an MCCH message that serves as the access trigger message and is transmitted in the MCCH.

According to another embodiment of the present invention, the receiving unit 91 may receive a Counting Request message that serves as the access trigger message.

In this way, the embodiment of the present invention, the group identity TMGI already existing in an MBMS can be used as the group identity of packet triggering UE access, and the access trigger message carrying the TMGI can be correspondingly generated and sent so as to trigger an access operation of the UE belonging to the TMGI, thereby implementing the function of the packet triggering user access.

The communication system according to the embodiments of the present invention may include the foregoing network side device or terminal device.

Persons of ordinary skill in the art may be aware that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated units are implemented in the form of a software functional unit and sold or used as an independent product, the integrated units may be stored in a computerreadable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The storage medium includes any medium that can store program code, such as a USB flash drive, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for controlling packet access, comprising:
generating an access trigger message, by modifying a Session Start Request message of a multimedia broadcast multicast service (MBMS) that includes a temporary mobile group identity (TMGI) allocated to a user equipment (UE) within a group of UEs, wherein the TMGI is in a mapping relationship with a service to be accessed by the group of UEs, wherein modifying includes one of using a spare or reserved position in the Session Start Request message to indicate that the Session Start request message serves as the access trigger message or using an information element combination in the Session Start Request message to indicate that the Session Start request message serves as the access trigger message;
sending the modified Session Start Request message, wherein the modified Session Start Request message serves as the access trigger message to packet trigger an access operation by the UE for the TMGI;
generating an end message for stopping the packet access operation, wherein the generating an end message comprises generating the end message using a Session Stop message of a MBMS of a core network or an access network, or an access parameter set by the access network; and
sending the end message to the UE.

2. The method according to claim 1, further comprising:
performing a core network packet grouping on the UE; and
allocating the TMGI to each core network packet of the UE as the core network group identity of the UE.

3. The method according to claim 1, further comprising:
sending a multipoint control channel (MCCH) message to the UE multiple times before the generating an end message for stopping the packet triggering.

4. The method according to claim 1, wherein the access trigger message further includes a session identifier for controlling operations of the UE.

5. The method according to claim 4, further comprising:
re-sending, after the UE accesses successfully and the session identifier changes, an access trigger message including the changed session identifier.

6. A method for controlling packet access, comprising:
receiving a modified Session Start Request message of a multimedia broadcast multicast service (MBMS), wherein the modified Session Start Request message includes a temporary mobile group identity (TMGI) allocated to a user equipment (UE) within a group of UEs, and one of a spare or reserved position to indicate that the modified Session Start request message serves as an access trigger message or a combination of IEs which indicates that the modified Session Start Request message serves as the access trigger message, wherein the TMGI is in a mapping relationship with a service to be accessed by the group of UEs;
performing an access operation for the TMGI according to the access trigger message; and
receiving an end message for stopping the packet triggering, wherein the end message is generated using a Session Stop message of a MBMS of a core network or an access network, or an access parameter set by the access network.

7. The method according to claim 6, further comprising:
stopping, when receiving the end message for stopping the packet triggering, access operations; or
not initiating, if access for the TMGI has been successfully initiated once before receiving the end message for stopping the packet triggering, access for the TMGI in a subsequent process; or
automatically initiating an access request or waiting for network side paging to initiate an access request if no access for the TMGI has been successfully initiated after receiving the end message for stopping the packet triggering.

8. The method according to claim 6, wherein the access trigger message also comprises a session identifier for controlling operations of the UE, and
the method further comprises:
operating according to the session identifier.

9. A network side device located on a core network, comprising:
a processor, configured to generate an access trigger message by modifying a Session Start Request message of a multimedia broadcast multicast service (MBMS) that includes a temporary mobile group identity (TMGI) allocated to a user equipment (UE) within a group of UEs, wherein the TMGI is in a mapping relationship with a service to be accessed by the group of UEs; wherein modifying includes one of using a spare or reserved position in the Session Start Request message to indicate that the Session Start request message serves as the access trigger message or using an information element combination in the Session Start Request message to indicate that the Session Start request message serves as the access trigger message;
a transceiver, configured to send the modified Session Start Request message, wherein the Session Start Request message serves as the access trigger message to packet trigger an access operation by the UE for the TMGI;
wherein the processor is further configured to generate an end message for stopping the packet access operation, wherein the an end message is generated using a Session Stop message of a MBMS of a core network or an access network, or an access parameter set by the access network; and
wherein the transceiver is further configured to send the end message to the UE.

10. A terminal device, comprising:
a transceiver, configured to receive a modified Session Start Request message of a multimedia broadcast multicast service (MBMS), wherein the modified Session Start Request message includes a temporary mobile group identity (TMGI) allocated to a user equipment (UE) within a group of UEs, and one of a spare or reserved position in the Session Start Request message to indicate that the modified Session Start request message serves as an access trigger message or a combination of IEs which indicates that the modified Session Start Request message serves as the access trigger message, wherein the TMGI is in a mapping relationship with a service to be accessed by the group of UEs;
a processor, configured to perform an access operation for the TMGI according to the access trigger message;
wherein the transceiver is further configured to receive an end message for stopping the access operation, wherein the end message is generated using a Session Stop message of a MBMS of a core network or an access network, or an access parameter set by the access network.

* * * * *